3,088,954
16β-HYDROXYMETHYL ANDROSTANES
Lawrence H. Knox, Mexico City, Mexico, assignor, by mesne assignments, to Syntex Corporation, a corporation of Panama
No Drawing. Filed Nov. 20, 1961, Ser. No. 153,754
Claims priority, application Mexico Sept. 26, 1961
26 Claims. (Cl. 260—397.4)

The present invention relates to certain new cyclopentanoperhydrophenanthrene derivatives and to a method for the preparation thereof.

More particularly, it relates to a method for preparing the novel 16β-hydroxymethyl derivatives of the androstane series, as well as their esters and ethers, which are represented by the following formulas:

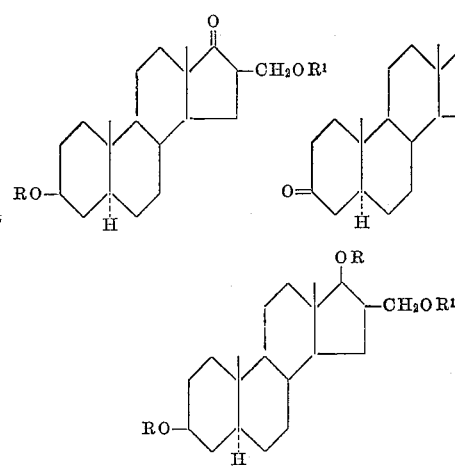

In the above formulas R represents hydrogen or an acyl radical of 1 to 12 carbon atoms; $R^1$ represents hydrogen, a lower alkyl group such as methyl, ethyl or propyl, a lower aralkyl group such as benzyl or diphenylmethyl, or an acyl radical derived from a carboxylic acid of up to 12 carbon atoms.

The acyl groups referred to above derive from a carboxylic acid of up to 12 carbon atoms, saturated or unsaturated, of straight, branched, cyclic or mixed aliphatic-cyclic chain, substituted or not with groups such as hydroxyl, methoxy, amino, halogen or other groups; typical such esters are the acetate, propionate, butyrate, valerate, hemisuccinate, enanthate, caproate, benzoate, undecenoate, trimethylacetate, phenoxyacetate, cyclopentylpropionate and β-chloropropionate.

The compounds object of the present invention are powerful anabolic agents having a favorable anabolic-androgenic ratio, help to increase the protein metabolism and the deposition of calcium on the bone tissue; furthermore, they show anti-estrogenic activity and inhibit the secretion of gonadotrophins by the pituitary gland.

The compounds object of the present invention are obtained by the method illustrated by the following series of reactions:

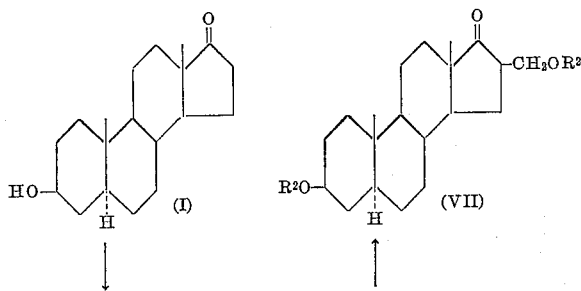

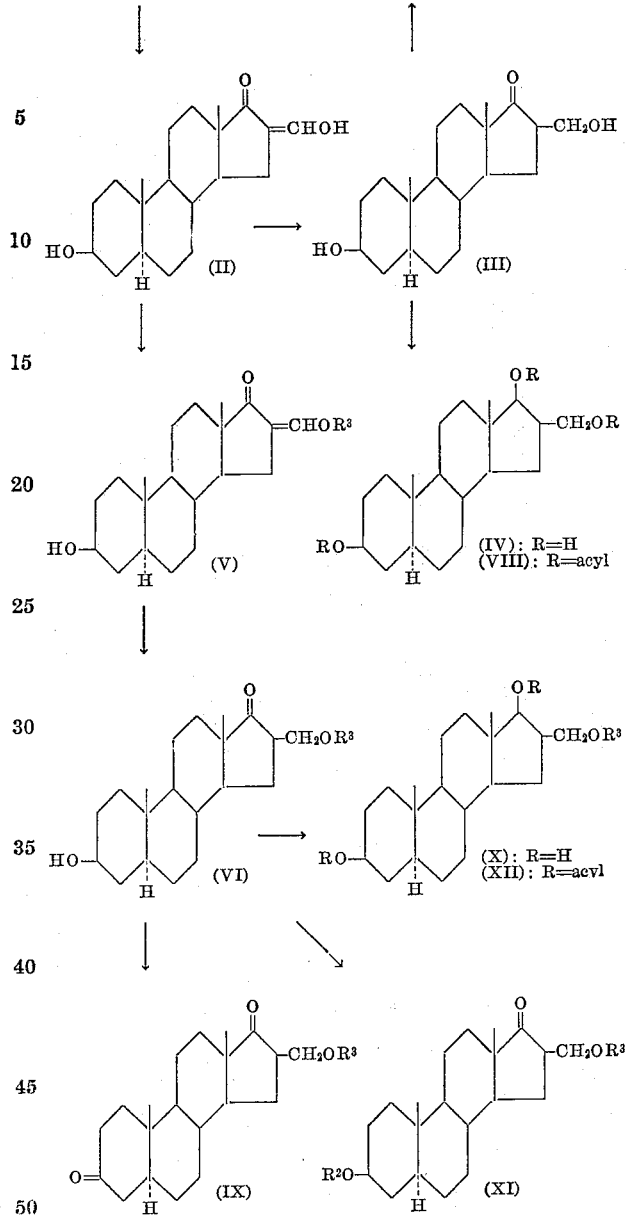

In the above formulas $R^2$ represents an acyl radical derived from a carboxylic acid of up to 12 carbon atoms; $R^3$ represents a lower alkyl group or lower aralkyl group.

The starting compound employed for the process object of the present invention is isoandrosterone, which in condensation with ethyl formate in benzene solution and in the presence of sodium hydride or sodium methoxide produces 16-hydroxymethylene-androstan-3β-ol-17-one (II). By catalytic hydrogenation of this compound in the presence of a palladium catalyst, such as 5% palladium on carbon, until the uptake of one molecular equivalent of hydrogen, there is obtained the 16β-hydroxymethyl compound (III). Adequate solvents for this reaction are tetrahydrofuran, ethyl acetate or lower aliphatic alcohols such as methanol, ethanol, propanol, isopropanol and the like. Conventional esterification of III with hydrocarbon carboxylic acids of up to 12 carbon atoms produce the esters (VII).

By reduction of 16β-hydroxymethyl-androstan-3β-ol-17-one (III) with a double metal hydride, such as lithium aluminum hydride or sodium borohydride, there is obtained 16β-hydroxymethyl-androstane-3β,17β-diol (IV), which is esterified with anhydrides or chlorides of carboxylic acids of up to 12 carbon atoms, in pyridine solution, employing conventional methods of esterification, to produce the triesters of 16β-hydroxymethyl-androstane-3β,17β-diol (VIII).

By reacting 16-hydroxymethylene-andronstan-3β-ol-17-one (II) with a diazoalkane, such as diazomethane, diazoethane, dimethyldiazomethane or other diazohydrocarbon, such as for example phenyldiazomethane or diphenyldiazomethane, there are obtained the 16-alkoxymethylene or aralkoxymethylene derivatives of androstan-3β-ol-17-one (V), which upon catalytic hydrogenation in the presence of palladium on carbon, in accordance with the method employed for hydrogenating the 16-hydroxymethylene group to the 16-hydroxymethyl group, gives rise to the formation of the corresponding 16β-alkoxymethyl and aralkoxymethyl compound (VI).

By oxidation of the 16β-alkoxymethyl and aralkoxymethyl derivatives of androstan-3β-ol-17-one (VI) with 8 N chromic acid in acetone-sulfuric acid solution, or in glacial acetic acid, there are obtained the corresponding 3,17-diketones (IX).

By reduction of the same compounds (VI) with lithium aluminum hydride or with sodium borohydride, there are obtained the 3,17-diols, i.e., the 16β-alkoxymethyl and aralkoxymethyl derivatives of androstane-3β,17β-diol (X).

The conventional esterification of 16β-hydroxymethyl-androstane-3β,17β-diol (IV), 16β-alkoxymethyl and aralkoxymethyl-3β-ol-17-one (VI) and 16β-alkoxymethyl and aralkoxymethyl-3β,17β-diol (X) gives rise to the formation of the corresponding esters, i.e. 16β-acyloxymethyl-3β,17β-diacyloxy-androstanes (VIII), 16β-alkoxymethyl and aralkoxymethyl-3β-acyloxy-androstan-17β-one (XI), and 16β-alkoxy and aralkoxymethyl-3,17β - diacyloxy-androstanes (XII).

The following specific examples serve to illustrate but are not intended to limit the present invention:

Example I

From a solution of 25 g. of isoandrosterone in 750 cc. of benzene free of thiophene was distilled 150 cc. of solvent in order to remove moisture by azeotropic distillation. The solution was cooled, treated with 60 cc. of ethyl formate and 18 g. of sodium methoxide, and the mixture was stirred under an atmosphere of nitrogen for 5 hours; hexane was added until complete precipitation of the sodium salt which was collected by filtration and dried under vacuum. The crude material was suspended in 1 liter of 3 N hydrochloric acid and stirred at room temperature for 2 hours. The precipitate was collected, washed with water and dried. Recrystallization from methylene chloride-hexane yielded 24 g. of 16-hydroxymethylene-androstan-3β-ol-17-one with M.P. 214–215° C., $[\alpha]_D$ +58° (CHCl$_3$); λmax. 266 mμ, log ε 4.02.

A solution of 10 g. of the latter compound in 100 cc. of tetrahydrofuran was hydrogenated in the presence of 3 g. of 5% palladium on carbon catalyst, at an initial pressure of 33 pounds. After 5 hours, there was added 6 more grams of catalyst and the hydrogenation was continued for 16 hours further. The catalyst was filtered through celite and the filtrate was evaporated to dryness under vacuum. The residue was crystallized from acetone-ether, thus affording 8.4 g. of 16β-hydroxymethyl-androstan-3β-ol-17-one; M.P. 197–199° C., $[\alpha]_D$ +84° (CHCl$_3$).

A solution of 2 g. of the above hydroxymethyl compound in 20 cc. of anhydrous tetrahydrofuran was added over a period of 30 minutes to a stirred suspension of 2 g. of lithium aluminum hydride in 100 cc. of anhydrous ether. The mixture was stirred at room temperature for 30 minutes further and the excess of reagent was destroyed with 5 cc. of ethyl acetate and 2 cc. of water. Saturated sodium sulfate solution was added, followed by solid sodium sulfate, and the solution was filtered and the solid was washed with sufficient hot ethyl acetate. The filtrate was evaporated to dryness and the residue recrystallized from acetone. There was thus obtained 1.55 g. of 16β-hydroxymethyl-androstane-3β,17β-diol; M.P. 266–268° C., $[\alpha]_D$ +4.5° (CHCl$_3$).

Example II

To a suspension of 10 g. of 16-hydroxymethylene-androstan-3β-ol-17-one in a mixture of 200 cc. of ether and 25 cc. of methanol, there was added an excess of an ether solution of diazomethane; the mixture was kept standing for 10 minutes, the excess of reagent was destroyed by the addition of a few drops of acetic acid and the mixture was evaporated to dryness. The residue was recrystallized from acetone, thus giving 4.19 g. of 16-methoxymethylene-androstan-3β-ol-17 - one with M.P. 204–206° C., $[\alpha]_D$ ±0° (CHCl$_3$); λmax. 266–267 mμ, log 4.19.

Example III

A solution of 5.3 g. of 16β-methoxymethylene-androstan-3β-ol-17-one in 50 cc. of anhydrous tetrahydrofuran was hydrogenated in the presence of 1 g. of 5% palladium on carbon at an initial pressure of 32 pounds. After the uptake of 1 mol of hydrogen the catalyst was removed by filtration and the solution evaporated to dryness. Crystallization of the residue from aectone afforded 16β-methoxymethyl-androstan-3β-ol-17-one with M.P. 207–209° C., $[\alpha]_D$ +90° (CHCl$_3$).

A solution of 2 g. of the latter compound in 8 cc. of pyridine was treated with 4 cc. of acetic anhydride and heated on the steam bath for 2 hours. The mixture was poured into ice water and the precipitate formed was collected, washed with water and dried. By recrystallization from methylene chloride-hexane, there was obtained the acetate of 16β-methoxymethyl-androstan-3β-ol-17-one which after recrystallization from ethanol showed M.P. 137–138° C., $[\alpha]_D$ +78° (CHCl$_3$).

In a similar manner, but using propionic and caproic anhydrides as esterifying agents, there were obtained the propionate and the caproate of 16β-methoxymethyl-androstan-3β-ol-17-one.

Example IV

A solution of 1 g. of 16β-methoxymethyl-androstan-3β-ol-17-one in 100 cc. of acetone was cooled to 0° C., then treated under an atmosphere of nitrogen and with stirring with an 8 N solution of chromic acid (prepared by mixing 26 g. of chromium trioxide with 23 cc. of concentrated sulfuric acid and diluting with water to 100 cc.), until the color of the reagent persisted in the mixture. The mixture was stirred for 5 minutes further at 0–5° C. and then diluted with water.

The precipitate was collected by filtration, washed with water and dried under vacuum; there was thus obtained a crude product which on crystallization from acetone-hexane afforded 16β-methoxymethyl-androstane - 3,17-dione; M.P. 138–140° C., $[\alpha]_D$ +11° (CHCl$_3$).

Example V

Example II was repeated, but using an ether solution of diazoethane instead of diazomethane, thus obtaining 16β-ethoxymethylene-androstan-3β-ol-17-one.

The foregoing compound was hydrogenated, in accordance with the method described in Example III, and the compound thus obtained, namely 16β-ethoxymethyl-androstan-3β-ol-17-one, was reduced with lithium aluminum hydride in mixture with tetrahydrofuran-ether, thus affording 16β-ethoxymethyl-androstane-3β,17β-diol.

Example VI

A mixture of 1 g. of 16β-hydroxymethyl-androstane-3β,17β-diol, 5 cc. of pyridine and 5 cc. of acetic anhydride was heated on the steam bath for 2 hours, cooled and the precipitate formed was collected. Crystallization from acetone-hexane afforded the triacetate of 16β-hydroxymethyl-androstane-3β,17β-diol, which showed a M.P. of 130–131° C., [α]$_D$ +11° (CHCl$_3$).

*Example VII*

By following the method described in Example I, 3 g. of 16β-methoxymethyl-androstan-3β-ol-17-one was reduced with lithium aluminum hydride. There was thus obtained 16β-methoxymethyl-androstane-3β,17β-diol which showed M.P. 210–212° C., [α]$_D$ +6° (CHCl$_3$).

By esterifying the above compound with acetic anhydride in pyridine in accordance with the method described in the preceding example, there was obtained the diacetate of 16β-methoxymethyl-androstane-3β,17β-diol with M.P. 156–158° C., [α]$_D$ +8° (CHCl$_3$).

*Example VIII*

A solution of 2 g. of 16β-hydroxymethyl-androstan-3β-ol-17-one in 8 cc. of pyridine was treated with 4 cc. of benzoyl chloride and then heated on the steam bath for 1 hour. The mixture was poured into ice water and the precipitate formed was collected, washed with water and dried. By recrystallization from methylene chloride-hexane, there was obtained the benzoate of 16β-benzoyloxymethyl-androstan-3β-ol-17-one.

*Example IX*

A mixture of 1 g. of 16β-hydroxymethyl-androstane-3β,17β-diol, 5 cc. of pyridine and 10 cc. of cyclopentylpropionic anhydride was kept at room temperature for 18 hours. It was then poured into water and the precipitate formed was collected, thus giving the 3,17-dicyclopentylpropionate of 16β-cyclopentylpropionoxymethyl-androstane-3β,17β-diol.

*Example X*

To a suspension of 5 g. of 16-hydroxymethylene-androstan-3β-ol-17-one in a mixture of 20 cc. of ether and 25 cc. of methanol, there was added dropwise and under stirring an ether solution of diphenyldiazomethane (Organic Syntheses, Collective Vol. III, p. 351), containing 1.2 molecular equivalents. The mixture was kept standing for 10 minutes, then a few drops of pyridine were added and the solvent was evaporated under reduced pressure. The residue was crystallized from acetone, thus yielding 16-diphenylmethoxymethylene-androstan-3β-ol-17-one.

By the same method, but using ether solutions of dimethyl-diazomethane and phenyldiazomethane as alkylating agents, there were respectively obtained 16-isoproxymethylene-androstan-3β-ol-17-one and 16-benzyloxymethylene-androstan-3β-ol-17-one.

*Example XI*

By following the method of hydrogenation described in Example III, 1 g. of 16-benzyloxymethylene-androstan-3β-ol-17-one was converted into 16-benzyloxymethyl-androstan-3β-ol-17-one. Oxidation of this compound with 8 N chromic acid, in accordance with the method described in Example IV produced 16-benzyloxymethyl-androstane-3,17-dione.

In the same manner, starting from 16-isopropoxymethylene-androstan-3β-ol-17-one, there were obtained 16-isopropoxymethyl-androstan-3β-ol-17-one and 16-isopropoxymethyl-androstane-3,17-dione.

*Example XII*

By following the method of esterification described in Example IX, the compounds mentioned below in column I were treated with acid anhydrides in pyridine solution, produce the respective diesters or esters.

| I Starting material | Anhydride employed | II Product obtained |
|---|---|---|
| 16-methoxymethylene-androstan-3β-ol-17-one. | propionic | propionate of 16-methoxymethylene-androstan-3β-ol-17-one. |
| 16β-methoxymethyl-androstan-3β,17β-diol. | do | dipropionate of 16β-methoxymethyl-androstane-3β,17β-diol. |
| 16β-methoxymethyl-androstane-3β,17β-diol. | undecenoic | diundecenoate of 16β-methoxymethyl-androstane-3β,17β-diol. |
| 16β-isopropoxymethyl-androstan-3β-ol-17-one. | caproic | caproate of 16β-isopropoxymethyl-androstan-3β-ol-17-one. |
| 16β-ethoxymethyl-androstan-3β-ol-17-one. | acetic | acetate of 16β-ethoxymethyl-androstan-3β-ol-17-one. |
| 16β-ethoxymethyl-androstane-3β,17β-diol. | propionic | dipropionate of 16β-ethoxymethyl-androstane-3β,17β-diol. |

I claim:
1. A compound of the following formula:

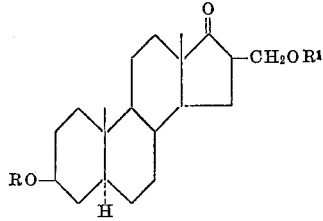

wherein R is selected from the group consisting of hydrogen and a hydrocarbon carboxylic acyl group of less than 12 carbon atoms and R$^1$ is selected from the group consisting of hydrogen, lower alkyl, lower aralkyl and a hydrocarbon carboxylic acyl group of less than 12 carbon atoms.

2. 16β-hydroxymethyl-androstan-3β-ol-17-one.
3. The 16-lower alkyl ethers of 16β-hydroxymethyl-androstan-3β-ol-17-one.
4. 16β-methoxymethyl-androstan-3β-ol-17-one.
5. The 16-lower aralkyl ethers of 16β-hydroxymethyl-androstan-3β-ol-17-one.
6. The hydrocarbon carboxylic acid esters of less than 12 carbon atoms of the 16-lower alkyl ethers of 16β-hydroxymethyl-androstan-3β-ol-17-one.
7. The hydrocarbon carboxylic acid esters of less than 12 carbon atoms of the 16-lower aralkyl ethers of 16β-hydroxymethyl-androstan-3β-ol-17-one.
8. The acetate of 16β-methoxymethyl-androstan-3β-ol-17-one.
9. The hydrocarbon carboxylic acid esters of less than 12 carbon atoms of 16β-hydroxymethyl-androstan-3β-ol-17-one.
10. A compound of the following formula:

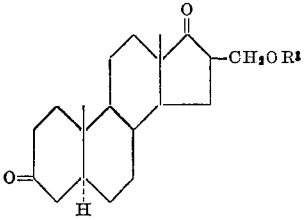

wherein R$^1$ is selected from the group consisting of lower alkyl, lower aralkyl and a hydrocarbon carboxylic acyl group of less than 12 carbon atoms.

11. The lower alkyl ethers of 16β-hydroxymethyl-androstane-3,17-dione.
12. The lower aralkyl ethers of 16β-hydroxymethyl-androstane-3,17-dione.
13. 16β-methoxymethyl-androstane-3,17-dione.
14. The hydrocarbon carboxylic acid esters of less than 12 carbon atoms of 16β-hydroxymethyl-androstane-3,17-dione.

15. A compound of the following formula:

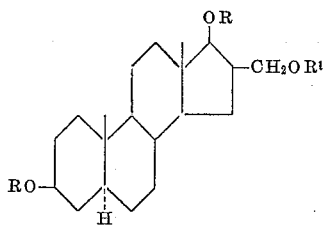

wherein R is selected from the group consisting of hydrogen and a hydrocarbon carboxylic acyl group of less than 12 carbon atoms and R¹ is selected from the group consisting of hydrogen, lower alkyl, lower aralkyl and a hydrocarbon carboxylic acyl group of less than 12 carbon atoms.

16. 16β-hydroxymethyl-androstane-3β,17β-diol.
17. The 16-lower alkyl ethers of 16β-hydroxymethyl-androstan-3β,17β-diol.
18. The 16-lower aralkyl ethers of 16β-hydroxymethyl-androstane-3β,17β-diol.
19. 16β-methoxymethyl-androstane-3β,17β-diol.
20. The hydrocarbon carboxylic acid esters of less than 12 carbon atoms of the 16-lower alkyl ethers of 16β-hydroxymethyl-androstane-3β,17β-diol.
21. The hydrocarbon carboxylic acid esters of less than 12 carbon atoms of the 16-lower aralkyl ethers of 16β-hydroxymethyl-androstane-3β,17β-diol.
22. The diacetate of 16β-methoxymethyl-androstane-3β,17β-diol.
23. The hydrocarbon carboxylic acid esters of less than 12 carbon atoms of 16β-hydroxymethyl-androstane-3β,17β-diol.
24. The triacetate of 16β-hydroxymethyl-androstane-3β,17β-diol.
25. 16-lower alkoxymethylene-androstan-3β-ol-17-one.
26. 16-methoxymethylene-androstan-3β-ol-17-one.

No references cited.